Sept. 26, 1967  MASAYOSHI MATSUI  3,343,987
ALKALINE STORAGE BATTERY
Filed Oct. 1, 1963
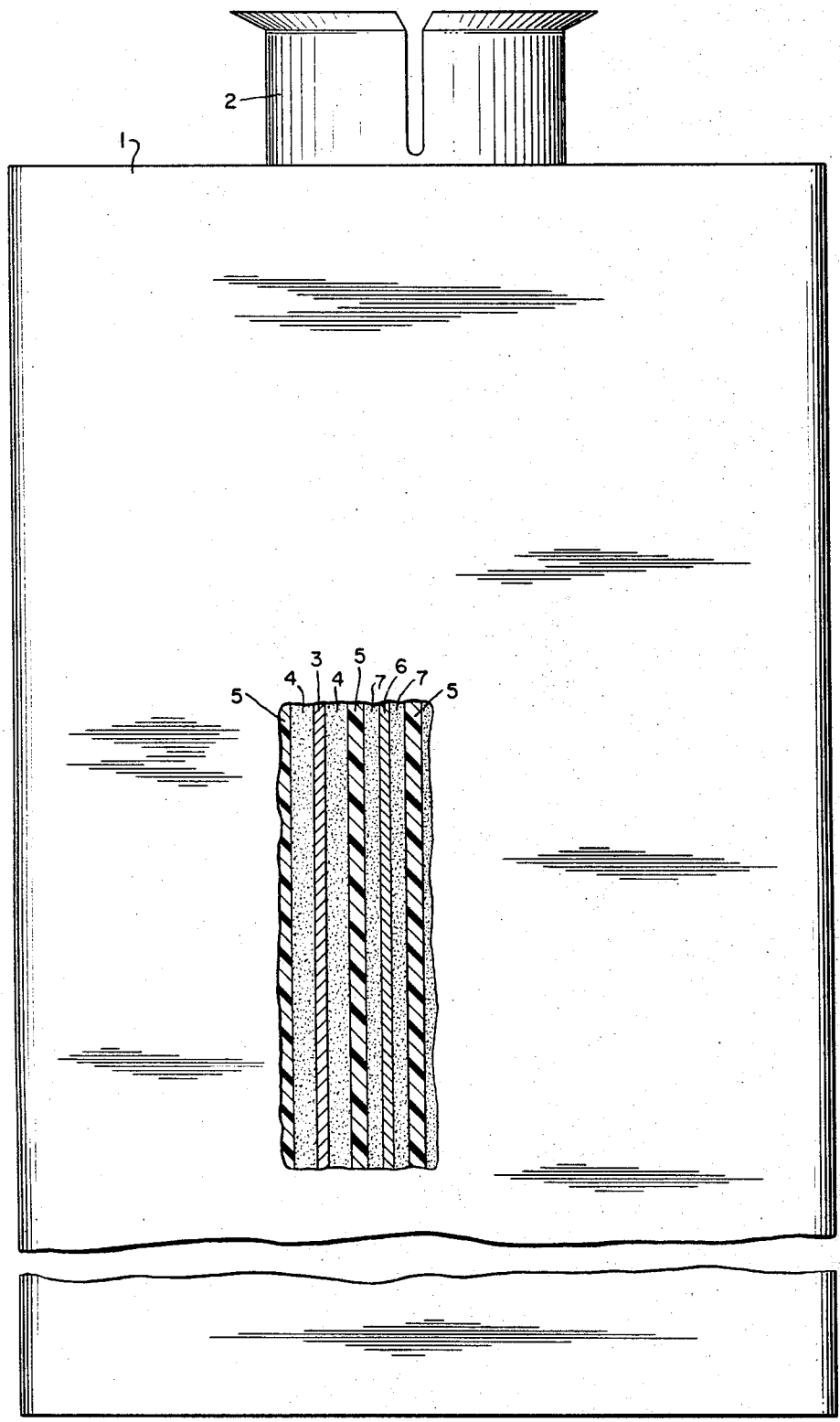

3,343,987
ALKALINE STORAGE BATTERY
Masayoshi Matsui, 410 Zenpukujicho, Suginami-ku,
Tokyo, Japan
Filed Oct. 1, 1963, Ser. No. 313,121
Claims priority, application Japan, Oct. 2, 1962,
37/42,643; Aug. 21, 1963, 38/43,670
3 Claims. (Cl. 136—24)

This invention relates to alkaline storage batteries of the type having positive and negative plates each including a base or support plate in the form of a metal plate or wire mesh carrying thereon a deposit of nickel hydroxide as positive active material or cadmium as negative active material and has for its object to provide an alkaline storage battery of the type described which is constructed to obtain a highly increased discharge output per unit volume or weight of the battery.

With recent developments of various electrical machines and appliances, there is an increasing demand for storage batteries to serve as power sources, which are compact, light in weight and of high output. For example, with conventional alkaline pocket type or lead acid type of storage batteries the discharge current practically available has been from 30 to 50 amperes for the 10 amp.-hr. capacity. (The battery capacity as referred to herein means the discharge amount at a low discharge rate for 10 or more hours.) On the other hand, sintered plate type of alkaline batteries has recently been found to afford a discharge rate as high as 200 to 300 amperes with 10 amp.-hr. capacity and are now in practical use.

Most of active materials are oxides which are much lower in electric conductivity than pure metals. Accordingly, an ordinary measure previously taken to reduce the internal resistance of a storage battery includes use of an increased number of plates each having a thickness reduced to approximately one millimeter. This is quite a natural and effective means for reducing the apparent current density and also for reducing the electrical resistance to the currents formed by respective grains of the active material and flowing through the plate to be collected. A development of this measure to positively solve the problem is the sintered plate type of alkaline batteries, which includes porous support plates each obtained by sintering a fine metallic powder in the size of 1 to 10 microns and having an 80 to 90% porosity with a thin and uniform deposit of active material formed on the surface of numerous pores in the porous support plate. It is evident that the electric current produced in this extremely thin layer of active material can flow against a very limited resistance to the particles of the sintered metal plate. The current can be conducted with ease to the current-collecting part of the plate since the sintered metal has a specific resistance much smaller than that of the active material in the form of an oxide. In addition, the sintered plate has a highly developed surface area because of the fine pores formed therein and hence the true current density is extraordinarily small. It is reported that a surface area of 6,000 cm.$^2$ has been actually measured with a sintered plate having one ampere-hour in capacity. In contrast, a layer of active material in the pocket type plates used in conventional alkaline storage batteries has a surface area of only 20 to 50 cm.$^2$ per ampere-hour.

From the foregoing explanation, clear is the reason why sintered plates have an extraordinarily high discharge output, but there still is left room for consideration. As described above, the layer of active material on the sintered plate has a true surface area more than one hundred times as large as that of pocket type plates. Therefore, upon the assumption that, with the two types of battery plate, the metal base on which the active material is deposited has an identical specific resistance, the electric current drawn out of the sintered plate must be more than one hundred times as large as that drawn out of the pocket type plate. In fact, however, only a current at most ten times as large can be drawn out, as pointed out hereinbefore. This discrepancy between the theoretical calculation and the actual measurement must be attributed to some causes other than the difference in surface area between the two types of battery plate, which act to restrain the flow of electric current during the discharge. Extensive researches conducted by the inventor have revealed that one of the major causes is the occurrence of markedly high current densities at particular points in the plate due to the non-uniformity of current distribution therein.

It is supposed that there are four factors of resistance originating in the interior of the plate. The first is an electrochemical resistance (overvoltage component) of particles themselves of active material in the charging or discharging. Secondly, electrons are transferred between the particles of active material against a resistance during the charge or discharge reaction. Thirdly, these electrons are also subjected to a resistance while they are passing through the metal substance (in case of the sintered plate, the sintered metal) to the circuit exterior of the plate. Finally, there is a resistance to the flow of ions in electrolyte occurring as the electrolyte adhering to the neighbourhood of the particles of active material move through the interstices between the particles to join the bulk of electrolyte solution lying outside of the plate.

With sintered plates, the fourth or electrolyte resistance in the interior of the plate has a value substantially the same as that of the first or electrochemical resistance in the particles of active material and therefore the electric current is largely concentrated on the plate surface. Such concentration of current on the plate surface is more pronounced with pocket type plates with little current allowed to flow through the interior of the plate. It follows, therefore, that, if the electrolyte resistance in the interior of the plate and the second and third resistances i.e. those to the currents flowing between the particles of active material and between the metal substances, respectively, be rendered much smaller than the first or electrochemical resistance in the particles of active material, the current distribution in the plate could be made uniform to markedly reduce the overall internal resistance of the plate and hence the internal resistance of the battery. To meet these requirements, the plate should be formed as follows. One form of such plate includes a base or support plate in the form of a metal plate or wire mesh and a deposition of positive or negative active material on the base having an appropriate thickness of 1 mm. or under. Another form corresponds to a sintered plate made similarly in an extremely limited thickness. The latter form, however, is impractical since it is difficult to obtain sintered plates of 1 mm. or less thickness for technological reasons. The former form of plate is similar to the Planté plate used in the early stages of development of the lead acid storage battery, as will readily be noted, and is in fact often utilized as a test electrode in theoretical researches. These known forms of plate are all advantageous in that they can afford a high current for its discharge capacity, and an absolute condition required of a practical storage battery is that it provides a high output for its bulk or weight. From this point of view, however, Planté or like plates can have only a very limited capacity per plate affording a limited discharge output per unit volume or weight. This is the reason why the pasted form of plate has been developed which includes an enormous number of particles of active material and is now in extensive use. Thus, storage batteries including plates of the Planté or like type are now out of practical use. However, it has been found that the cause of the development of such storage batteries is not applicable to those of the alkaline type and that the storage battery constructed according to the present invention, which satisfy certain conditions as will be described hereinafter and include a compacted stack of positive and negative plates each having a specified thickness, can have a discharge current or output much higher than that obtainable with alkaline batteries now in common use and having the same volume or weight.

The present invention is applicable exclusively to the construction of alkaline storage batteries. The reason for this is that with batteries including such thin closely stacked plates the amount of the electrolyte contained therein is naturally limited. With lead acid storage batteries, the electrolyte directly takes part in the electrode reaction and concentration change is caused by the charging and discharging of the battery to heavily influence the capacity and the resistance components thereof. With alkaline storage batteries, which is substantially free from such change in concentration of the electrolyte, the quantity thereof in the battery is not subject to limitations as with the case of lead acid storage batteries. This is why the present invention is limited to alkaline batteries.

In order to obtain a higher discharge output with a battery, not only the positive and negative plates must have an appropriate range of thickness but also an appropriate capacity ratio must be selected between the negative and positive electrodes. Generally the thickness ratio between the layers of active material on the positive and negative plates having the same discharging capacity is approximately 2 to 1, the negative plates having a smaller thickness. In addition, when a battery discharges at a high rate, the discharge capacity as well as the discharge voltage of the negative electrode is reduced considerably. Therefore, the overall discharge output of the battery depends upon the value of capacity ratio of the negative to the positive electrode.

In view of the above, the present invention principally employs a plate form including a metal plate or wire mesh and a deposit thereon of active material having an appropriate thickness in an alkaline storage battery employing nickel hydroxide and cadmium as positive and negative active materials for the purpose of obtaining an increased output at high discharge rates without increasing the battery volume or weight. In addition, the capacity ratio between the negative and positive electrodes is determined in an appropriate range and such positive and negative plates are closely stacked with thin separators interposed between the adjacent plates to form the battery.

The present invention thus lies in an alkaline storage battery constructed on the above principles to meet given conditions. The metal plate or wire mesh as a base plate should be made of an alkali-resistant metal, which prevents the corrosion during the charging and discharging of the battery. Proper metals for this purpose include nickel, iron, copper, etc. Among others, copper is preferred for use in negative plates. Alternatively, such metal may be electroplated on an appropriate base plate. The thickness of the base plate should be determined upon the basis of its electrical conductivity appropriately in a range of from 0.01 mm. to 0.1 mm. In the case of a base plate having a 0.01 mm. thickness and made of nickel metal, which is comparatively low in conductivity, the value of electrical resistance across the opposite ends of a 1-cm.$^2$ area of the plate is $11.8 \times 10^{-3} \Omega$. Therefore, the IR drop through such plate is almost negligible. For example, assuming that a heavy current of 300 to 500 milliamperes flows through square centimeter of the plate area, the IR drop amounts only to 0.354 to 0.590 millivolt. Such plates are not required to have any high mechanical strengths as battery plates are only stacked up evenly. The positive or negative active material is subsequently deposited on the above described base plate to form a battery plate by any desired procedure. Among others, the electrolytic process is most appropriate for the purpose as it has an advantage that it can at all times produce electrode plates having thicknesses exactly as desired simply by controlling the magnitude of the electrolytic current and also the time.

The layer of active material as formed on the plate in the manner described still includes particles loosely clinging to each other and thus has no satisfactory density or compactness. Such active layer on the plate can be made dense by mechanically compressing the positive or negative plate or by stacking up such plates with separators interposed and compressing the stack under an appropriate pressure. If the stacked plate assembly be compressed under any excessive pressure, some reduction in discharge voltage and in discharging capacity would take place. According to the experiments conducted by the inventor the pressure should be determined at a value from 10 to 50 kg./cm.$^2$ depending upon the procedure of manufacturing of the plates, the material of which the separators are made, and other factors. The separators should obviously have a thickness as small as possible as long as no short-circuiting occurs between the positive and negative plates. An appropriate thickness range is from 0.02 to 0.1 mm. The separator material is required to be alkali-resistant and to withstand any corroding effect of the charging or discharging reaction. Preferred materials include paper, cellophane, synthetic fiber and the like.

Next, the thicknesses of the layers of positive and negative active materials and the discharge capacity ratio $r$ between the negative and positive electrodes must be properly determined. Any ratio $r$ smaller than unit counts for nothing for the reasons described hereinbefore. Any excessively small thickness of the layer of active material results in a reduced discharge capacity per unit volume or weight and hence in a limited discharge output. In view of these facts, the inventor has made experiments to determine appropriate ranges to give satisfactory outputs. In the experiments, plates were prepared in a number of kinds having layers of active material formed in respective thicknesses for each of a number of values of $r$ larger than unit. The thickness of the layer of active material as referred to here represents that obtained after the plate has been compressed under a predetermined pressure as described hereinbefore. The thickness value can be further stabilized if the plate after such compression undergoes charging and discharging. Also, the thickness of the layer of active material on the plate is nearly proportional to the discharge capacity thereof. The value of ratio $r$ was obtained upon the basis of the discharge capacity of the positive electrode in the battery as assembled by the above-described procedure (i.e., the discharge capacity of the battery) and the capacity value of the negative electrode as obtained when the electrode was discharged separately before its assembling into the battery or after its disassembly. The reason for this was that it is difficult to experimentally determine the inherent discharge capacity only of the negative plates as assembled according to the present invention in a closely compressed state in the battery.

According to the experiments, satisfactory results can be obtained when the ratio $r$ has a value of from 1.4 to 2.5 and the total thickness of the active layers formed on the opposite surfaces of the base plates is from 0.04 to 0.4 mm. for the positive electrode and from 0.03 to 0.4 mm. for the negative electrode. However, these ranges can be departed to a more or less extent without causing abrupt reduction in the output of the battery. In fact, batteries having the ratio of from 1.0 to 1.4 or from 2.5 to 4 give a considerably high discarge output and have a discharge capacity per unit volume or weight of the battery which corresponds to or exceed that of conventional alkaline batteries as will be described hereinafter. Values of the ratio $r$ larger than 4 give high discharge outputs but are useless as the result in a discharge capacity of the negative electrode which is excessively large and increases the production cost of the battery.

The stack of plates prepared in the manner described above is enclosed in a container, which is only required to retain the plate assembly under light pressure since the plates in the stacked assembly, after they have once been pressed together, will not get loose clinging tightly to each other. Also, alkaline storage batteries in general can operate satisfactorily even with a limited quantity of electrolyte contained, as pointed out hereinbefore. Such limited quantity of electrolyte can apparently be retained in the assembly of plates and separators of the invention. The positive and negative terminals may be provided in direct connection with the positive and negative plates, respectively.

It will be noted that storage batteries constructed in this manner virtually correspond in volume and in weight to the stack of plates therein. Also, such has a discharge capacity per unit volume or weight of the plate stack not less than 0.030 amp-hr./cc. or 0.010 amp-hr./g., which is contrasted to 0.03 to 0.06 amp-hr./cc. or 0.010 to 0.030 amp-hr./g. of conventional alkaline batteries. A further important feature of the storage battery of the present invention is that it exhibits at higher discharge rates a discharge output much higher than that obtained with sintered-plate type of storage batteries. As described hereinbefore, sintered-plate type of 10 amp.-hr. capacity can only deliver a current of at most 200 to 300 amperes in practice. In contrast to this, the storage battery of the present invention can deliver a current of 1,000 to 2,000 amperes for the same volume or weight of the battery. Moreover, the present storage battery, can be employed to advantage not only in such applications requiring extraordinary high discharge rates. The present storage battery is also applicable to communication and other uses where any voltage variation must be avoided during operation since it has naturally an extraodinarily small internal resistance and thus involves only an extremely small voltage variation during discharge. In addition, the storage battery of the present invention could be produced at reduced cost, overcoming one of the major drawbacks of conventional alkaline storage batteries. Firstly, in contrast to conventional sintered-plate type of storage batteries, in which a large quantity of expensive nickel powder is required to form base plates, the present storage battery does not involve such material cost. Also, the manufacture of sintered-plate type of storage batteries particularly of the pocket type involves complicated steps, and therefore the manufacturing expenses and time of their production largely affect the production cost of such batteries. On the other hand, the battery of the present invention can be produced by a process including only a few simple steps, which makes it possible to make the battery from raw materials therefor on a fully automatized machine and hence at minimum cost and in a very limited work period.

For better understanding of the present invention, some practical examples will now be described, with reference to the accompanying drawing showing an enlarged side view of a battery in accordance with the invention, with a portion of the casing broken away to show schematically the arrangement of plates and separators in the battery.

The battery is illustrated by way of example in the drawing as having a casing 1 and suitable terminals 2, only one of which appears in the drawing since the other is directly behind it. Positive plates each comprising a base plate 3 carrying on each side a layer 4 of active material are separated by separators 5 from negative plates each comprising a base plate 6 carrying on each side a layer 7 of active material.

*Example 1*

Five base plates were prepared for the positive electrode and six for the negative electrode. Each of these base plates, positive and negative, took the form of a cold-finished steel sheet having a thickness of 0.08 mm. and a surface area of 3 x 5.2 cm. These plates were nickel plated to a thickness of 0.10 mm.

Nickel hydroxide or cadmium hydroxide was uniformly deposited on these plates by the electrolytic process. The positive plates were each formed in this manner to exhibit a discharge output of 100 milliamp-hr. Also, the ratio $r$ of the discharge capacity of the negative electrode to that of the positive electrode was determined in five values, 1.0, 1.4, 2.0, 2.5 and 4.0 to obtain five kinds of battery.

The deposit area of the active material was 3.0 x 5.0 cm. on each side of the base plate and thus its top length of 0.2 cm. was exposed carrying no active material. The exposed top portion formed a current-collecting part of the electrode plate, which was placed in direct contact with the positive or negative terminal of the battery when assembled.

The positive plates immediately after the electrolysis carried on each side of the plate a layer of active material having an average thickness of 0.25 mm. The negative plates carried layers of active material of average thicknesses of 0.16, 0.20, 0.26, 0.30 and 0.45 mm. for respective values of ratio $r$, 1.0, 1.4, 2.0, 2.5 and 4.0.

Batteries were assembled with five positive and six negative plates so as to obtain the respective values of ratio $r$. The discharge capacity and the ratio $r$ were determined in the above-described manner. Separators used were made of synthetic fiber and had a thickness of 0.1 mm. prior to their assembling into batteries. The plates and separators were stacked in lamination in the order of a negative plate, separator, positive plate, separator, negative plate, separator, etc. so that the outermost layers were formed of a negative plate. The lamination was made so that those portions of the positive and negative plates carrying active material coincided with each other with the exposed portions of the base plates projecting alternately beyond the upper and lower edges of the laminated assembly. The plates and separators were impregnated in advance with the electrolyte. The stacked assembly was placed on a press and compressed under a pressure of 500 kg. acting at right angles to the plate surfaces. Subsequently, the stacked assembly was encased in a casing made from thin plastic sheet having an internal volume corresponding to the volume of the assembly and terminal plates were jointed under pressure to the exposed end portions of the plates having no deposit of active material to complete a battery.

The thicknesses of active layers on the positive and negative plates and various characteristics of the batteries made in this manner are listed below.

TABLE 1

| No. of battery | Ratio, $r$ | Thickness of active layer | | Discharge capacity[a] per unit volume or weight, Ah./cc. or Ah./g.×10³ | Discharge output[a] per unit volume or weight | | |
|---|---|---|---|---|---|---|---|
| | | Positive electrode, mm. | Negative electrode, mm. | | 1 $c$ discharge,[b] wh./cc. or wh./g.×10³ | 30 $c$ discharge, wh./cc. or wh./g.×10³ | 100 $c$ instantaneous discharge, w./cc. or w./g. |
| 1 | 1.0 | 0.21 | 0.12 | 92 / 25 | 100 / 28 | 40 / 11 | 9.6 / 2.6 |
| 2 | 1.4 | 0.20 | 0.15 | 81 / 23 | 100 / 29 | 46 / 13 | 9.3 / 2.7 |
| 3 | 2.0 | 0.22 | 0.20 | 75 / 22 | 93 / 27 | 64 / 19 | 8.8 / 2.6 |
| 4 | 2.5 | 0.21 | 0.24 | 72 / 21 | 88 / 26 | 66 / 20 | 8.5 / 2.5 |
| 5 | 4.0 | 0.20 | 0.40 | 68 / 20 | 85 / 25 | 68 / 20 | 7.5 / 2.2 |

[a] For each of the batteries Nos. 1, 2, 3, 4 and 5, the upper figures represent the discharge capacity or output per unit volume and the lower figures represent the capacity or output per unit weight.

[b] Character "$c$" represents a value of discharge capacity. For example, "1 $c$ discharge" represents a discharge current at one-hour rate.

The following table lists the discharge outputs of a sintered-plate type of storage battery having the same discharge capacity for comparison with Table 1.

TABLE 2

| | 1 $c$ discharge output, wh./cc. or wh./g.×10³ | 30 $c$ discharge output, wh./cc. or wh./g.×10³ | 100 $c$ instantaneous discharge output, w./cc. or w./g. |
|---|---|---|---|
| Per unit volume | 40–50 | 17–20 | 0.0 |
| Per unit weight | 20–25 | 8–10 | 0.0 |

As apparent from the comparison between Tables 1 and 2, the storage batteries of the present invention had a discharge output per unit volume about twice as large as that of the sintered-plate type at the one-hour rate discharge. The batteries of the present invention exceeded only slightly in values per unit weight at the same hour rate. However, with an increased discharge current about 30 times as large as that at the one-hour rate, the discharge output per unit volume of the present batteries was more than about 2.5 to 3 times as large as that of the sintered-plate type and the discharge output per unit weight was increased twice or nearly twice. Finally, in case the discharge current was increased about 100 times as large as that at the one-hour rate, even the sintered-plate type was rendered almost inoperable though this type of battery is now attracting public attention because of its high discharge rate. In contrast, the batteries of the present invention all were found to discharge in such high currents as seen in Table 1, and their instantaneous discharge output increased extremely larger than that of the sintered-plate type. It will be appreciated from the foregoing that the storage battery of this invention has an important feature that its superiority to the sintered plate type of storage battery in discharge ouput per unit volume and per unit weight is magnified as the discharge rate is raised. The advantageous features of the present storage battery makes it particularly suitable for automotive and other uses where an extremely large discharge output is required for a short time as in starting the engine. Since the discharge output required to start the engine has a definite value, it will be appreciated that the present storage battery can be made much more compact and lightweight than possible with the sintered plate type. In addition, the present storage battery is lower in production cost per unit capacity than the sintered plate type and thus is all the more valuable in practical applications.

Example 2

Base plates for both the positive and negative electrodes were formed of a strip of nickel foil of 0.05 mm. thickness and 5.2 cm. width. As in Example 1, the positive or negative active material was uniformly deposited on the strip in a width of 5.0 cm. leaving the top end portion thereof uncovered. A fixed capacity ratio of 1.6 mm. was employed between the negative and positive electrodes. A number of batteries were fabricated with different discharge capacities of the positive and negative electrodes. In this example, the positive and negative plates with separators interposed therebetween were coiled spirally to form a battery. A positive and a negative terminal were secured to the opposite ends of the coiled battery, the plates being arranged relative to each other in a manner such that the active layers thereon are placed accurately in register and in parallel face-to-face relation to each other. In coiling the plates and separators in a spiral form, a roller was employed under a definite load to continuously press together the plates and separators while being coiled. Thus, the cylindrical roll of interleaved plates and separators and the loaded cylindrical roller were kept in tangential contact with each other during the coiling operation. The loaded roller had a definite overall weight of 15 kg. The positive and negative plates should have different lengths, which depend upon whether the outermost layer of the coiled roll is formed of a positive or negative plate. In this example, the outer layer was a negative plate.

Any excessive lengths of the plates were severed when the diameter of the coiled roll reached a value of 3 cm. Later steps of fabricating storage batteries were the same as those in Example 1.

Batteries obtained in this manner had characteristics as listed below.

TABLE 3

| No. of battery | Ratio, r | Thickness of active layer | | Discharge capacity [a] per unit volume or weight, Ah./cc. or Ah./g.×10³ | Discharge output per unit volume or weight [a] | | |
|---|---|---|---|---|---|---|---|
| | | Positive electrode, mm. | Negative electrode, mm. | | 1 c discharge, wh./cc. or wh./g.×10³ | 30 c discharge, wh./cc. or wh./g.×10³ | 100 c instantaneous discharge, w./cc. or w./g. |
| A | 1.6 | 0.06 | 0.04 | 42 / 14 | 52 / 18 | 45 / 15 | 5.0 / 1.7 |
| B | 1.6 | 0.11 | 0.08 | 60 / 22 | 74 / 27 | 61 / 22 | 6.8 / 2.4 |
| C | 1.6 | 0.29 | 0.22 | 92 / 37 | 113 / 45 | 50 / 20 | — |

[a] For each of the batteries A, B and C, the upper figures represent the discharge capacity or output per unit volume and the lower figures represent the capacity or output per unit weight.

In this example, two kinds of battery are illustrated including one having an increased discharge output when an extraordinarily large current flows and the other having a high discharge output when discharged at a one-hour or like high rate.

In contrast to the present storage battery illustrated in Table 3, the performances of conventional alkaline storage batteries are listed in Table 4.

TABLE 4

| | 1 c discharge output, wh./cc. or wh./g.×10³ | 30 c discharge output, wh./cc. or wh./g.×10³ | 100 c instantaneous discharge output, w./cc. or w./g. |
|---|---|---|---|
| Sintered-plate type of alkaline storage battery: | | | |
| Unit volume | 40–50 | 17–20 | 0.0 |
| Unit weight | 20–25 | 8–10 | 0.0 |
| Pocket type of alkaline storage battery: | | | |
| Unit volume | 25–30 | Impossible | Impossible |
| Unit weight | 10–25 | Impossible | Impossible |

As apparent from the comparison between Tables 3 and 4, the storage battery of the present invention exhibits a discharge output exceeding that of any conventional alkaline storage battery over a wide range of discharge of from a one-hour rate to a rate about 100 times as high. In other words, it is evident that the present storage battery can be made extraordinarily compact and light weight as compared with conventional ones for the same discharge output.

What is claimed is:

1. A nickel-cadmium alkaline storage battery of the type including at least a positive plate and at least a negative plate impregnated with an electrolyte and laminated alternately with separators impregnated with an electrolyte and interposed between the adjacent plates, said positive and negative plates each including a non-sintered base plate of alkali-resistant metal and a uniform electrodeposit of active material on the surface thereof, the total thickness of the deposit layers of active material on said positive plate being from 0.04 to 0.4 mm. while the total thickness of the deposit layers of active material on said negative plate is from 0.03 to 0.4 mm., the ratio of the discharge capacity of said negative plate to that of said positive plate being in the range of from 1.0 to 4.0, the storage battery having a discharge capacity per unit volume or weight of all of said positive plates, negative plates and electrolyte-impregnated separators assembled of not less than 0.030 amp.-hr./cc. or 0.010 amp.-hr./g.

2. An alkaline storage battery as claimed in claim 1 in which the ratio of the discharge capacity of the negative plate to that of the positive plate is from 1.4 to 2.5.

3. A storage battery according to claim 1, in which the laminate of plates and separators are enclosed in a container having an internal volume essentially the same as the volume of the laminate.

References Cited

UNITED STATES PATENTS

| | | | |
|---|---|---|---|
| 1,377,194 | 5/1921 | Edison | 136—28 |
| 1,379,088 | 5/1921 | Edison | 136—28 |
| 1,879,904 | 9/1932 | Kranzlein et al. | 136—28 |
| 2,004,552 | 6/1935 | Drumm et al. | 136—28 |
| 2,714,624 | 8/1955 | Costa et al. | 136—28 |
| 2,942,059 | 6/1960 | Doyle et al. | 136—176 |
| 3,002,041 | 9/1961 | Daley | 136—176 |
| 3,174,878 | 3/1965 | Peters | 136—6 |

WINSTON A. DOUGLAS, *Primary Examiner.*

B. J. OHLENDORF, A. SKAPARS, *Assistant Examiners.*